3,316,299
BIS(2-AMINOOXYETHYL)SULFONES
Leo A. Paquette, Portage Township, Kalamazoo County, Mich., assignor to The Upjohn Company, Kalamazoo, Mich., a corporation of Delaware
No Drawing. Filed Aug. 27, 1963, Ser. No. 304,979
5 Claims. (Cl. 260—583)

This invention relates to novel compounds and to a process for their preparation and is particularly directed to novel bis(2-aminooxyethyl)sulfones and their preparation.

The novel bis(2-aminooxyethyl)sulfones are represented by the formula:

$$RRN-O-CH_2-CH_2-SO_2-CH_2-CH_2-O-NRR$$
(I)

wherein RRN— is selected from the group consisting of di-lower-alkylamino and the heterocyclic moieties, aziridinyl, azetidinyl, pyrrolidinyl, piperidino, hexahydroazepinyl, heptamethylenimino, octamethylenimino, morpholino, and thiomorpholino, each of said heterocyclic moieties having attached as substituents on carbon atoms thereof zero to 3 lower alkyls, inclusive. When RRN— is di-lower-alkylamino, the lower alkyls, R, can be the same or different. When RRN— is a heterocyclic moiety with 2 or more alkyls, the alkyls can be the same or different. Examples of lower alkyls within the scope of di-lower-alkylamino are methyl, ethyl, propyl, butyl, pentyl, hexyl, heptyl, octyl, and the isomeric forms thereof. Examples of heterocyclic moieties within the scope of RRN—, in addition to those already mentioned above, are 2-methylaziridinyl, 2-ethylaziridinyl, 2-butylaziridinyl, 2,3-dimethylaziridinyl, 2,2-dimethylaziridinyl, 2-methylazetidinyl, 3-methylazetidinyl, 2-octylazetidinyl, 2,2-dimethylazetidinyl, 3,3-diethylazetidinyl, 2,3,4-trimethylazetidinyl, 2-methylpyrrolidinyl, 3-butylpyrrolidinyl, 2-isohexylpyrrolidinyl, 2,3-dimethylpyrrolidinyl, 2,2-dimethylpyrrolidinyl, 2,5-diethylpyrrolidinyl, 3-tert-butylpyrrolidinyl, 2,3,5-trimethylpyrrolidinyl, 3,4-dioctylpyrrolidinyl, 2-methylpiperidino, 3-methylpiperidino, 4-methylpiperidino, 3-isopropylpiperidino, 4-tert-butylpiperidino, 2-methyl-5-ethylpiperidino, 3,5-dipentylpiperidino, 2,4,6-trimethylpiperidino, 2,6-dimethyl-4-octylpiperidino, 2,3,5-triethylpiperidino, 2-ethylhexahydroazepinyl, 4-tert-butylhexahydroazepinyl, 3-heptylhexahydroazepinyl, 2,4-dimethylhexahydroazepinyl, 3,3 - dimethylhexahydroazepinyl, 2,4,6 - tripropylhexahydroazepinyl, 2 - methylheptamethylenimino, 5-butylheptamethylenimino, 2,4-diisopropylheptamethylenimino, 3,3-diethylheptamethylenimino, 2,5,8-trimethylheptamethylenimino, 3-methyloctamethylenimino, 2,9-diethyloctamethylenimino, 4-isooctyloctamethylenimino, 2-ethylmorpholino, 2-methyl-5-ethylmorpholino, 3,3-dimethylmorpholino, 2,6 - di - tert-butylmorpholino, 3-methylthiomorpholino, 2,2-diethylthiomorpholino, 2,6-dihexylthiomorpholino, and the like. In each of the above examples of heterocyclic moieties, the free valence, and hence the point of attachment to the oxygen atoms in Formula I, is on the heterocyclic nitrogen atoms.

The novel bis(2-aminooxyethyl)sulfones of Formula I exist either in the nonprotonated (free base) form or the protonated form depending upon the pH of the environment. They form stable protonates (acid addition salts) on neutralization with suitable acids, for example, hydrochloric, hydrobromic, sulfuric, phosphoric, nitric, perchloric, thiocyanic, fluosilicic, acetic, benzoic, salicylic, glycolic, succinic, nicotinic, tartaric, maleic, malic, lactic, methanesulfonic, and cyclohexanesulfamic acids, and the like. These acid addition salts are useful in upgrading the free bases. The corresponding free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The novel bis(2-aminooxyethyl)sulfones can be prepared by reacting divinyl sulfone with a hydroxylamine of the formula RRN—OH wherein RRN— is as given above. The hydroxylamines of the formula RRN—OH can be prepared by oxidizing a tertiary amine of the formula RRN—CH$_2$CH$_3$ wherein RRN— is as given above, with a peroxidizing agent, e.g., hydrogen peroxide, to form the N-oxide thereof and heating the same to drive off ethylene according to the following equation:

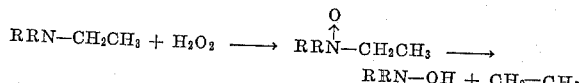

Advantageously, two equivalents of the hydroxylamine dissolved in an inert solvent, e.g., ether, tetrahydrofuran, benzene, dioxane, toluene, and the like, containing a trace of a basic catalyst, e.g., sodium hydroxide, potassium hydroxide, benzyltrimethylammonium hydroxide, and the like, are added to one equivalent of divinyl sulfone. The temperature is advantageously held between about 20° C. and about 70° C. though higher or lower temperatures, say from about 15° C. to about 110° C., can be used. The bis(2-aminooxyethyl)sulfone can be recovered by distillation, converted to an acid addition salt in a conventional manner, and then purified if so desired, e.g., by recrystallization.

The novel compounds of Formula I, either in the free base form or as an acid addition salt of a pharmacologically acceptable acid, act to depress the central nervous system in animals such as mice and rats and can be used to effect sedation in mammals, e.g., cattle, horses, dogs and cats, and in birds, e.g., poultry.

The invention may be more fully understood by the following examples which embody the best manner known for carrying out the invention.

*Example 1*

A. *N,N-diethylhydroxylamine*

Triethylamine was reacted with hydrogen peroxide to form the N-oxide which in turn was converted to N,N-diethylhydroxylamine by heating to drive off ethylene by the procedure of Thesing and Sirrenberg, Chem. Ber. 92, 1748 (1959).

B. *N,N'-[sulfonylbis(ethyleneoxy)]bisdiethylamine*

To a rapidly stirred solution of 35.6 g. (0.40 mole) of N,N-diethylhydroxylamine and 3 drops of 50% aqueous sodium hydroxide solution in 50 ml. of dioxane heated to 60° C. was added dropwise a solution of 23.6 g. (0.20 mole) of divinyl sulfone in 50 ml. of dioxane over a 15-minute period. After heating at 70° C. for 3 hours, the mixture was allowed to stand at room temperature overnight. The solvent was removed under reduced pressure and the residue was directly distilled to give 41.2 g. (69.7%) of N,N'-[sulfonylbis(ethyleneoxy)]bisdiethylamine as a viscous pale yellow liquid, boiling point 76–85° C. (0.2 mm.).

C. *N,N'-[sulfonylbis(ethyleneoxy)]bisdiethylamine dihydrochloride*

The amine of part B was converted to its dihydrochloride by adding an ethereal hydrogen chloride solution to a solution of the base in ether and, after three recrystallizations from ethanol-ether, N,N'-[sulfonylbis(ethyleneoxy)]bisdiethylamine dihydrochloride was obtained as small white plates, M.P. 157.6–159° C.

*Analysis.*—Calcd. for $C_{12}H_{30}Cl_2N_2O_4S$: C, 39.02; H, 8.19; N, 7.59. Found: C, 39.37; H, 8.33; N, 7.27.

Following the procedure of the above example, parts A and B, but substituting for the triethylamine,
N-ethyldimethylamine,
N-methyldiethylamine,
N-ethyldipropylamine,
N-ethyldiisopropylamine,
N-ethyl-N-methylisopropylamine,
N-ethyldibutylamine,
N-ethyl-di-sec-butylamine,
N-ethyldiisobutylamine,
N-ethyl-di-tert-butylamine,
N-ethyl-N-methylbutylamine,
N,N-diethyl-sec-butylamine,
N-ethyldipentylamine,
N-ethyldiisopentylamine,
N-ethyl-N-methylpentylamine,
N,N-diethyl-2-methylbutylamine,
N-ethyldihexylamine,
N-ethyldiisohexylamine,
N-ethyl-N-methylhexylamine,
N,N-diethyl-2,3-dimethylbutylamine,
N-propyldiethylamine,
N-ethylaziridine,
N-ethyl-2-methylaziridine,
N-ethyl-2,3-dimethylaziridine,
N-ethyl-2,2-dimethylaziridine,
N-ethylazetidine,
N-ethyl-2-methylazetidine,
N-ethyl-3-methylazetidine,
N-ethyl-2-octylazetidine,
N-ethyl-2,2-dimethylazetidine,
N-ethyl-3,3-dimethylazetidine,
N-ethyl-2,4,4-trimethylazetidine,
N-ethylpyrrolidine,
N-ethyl-2-methylpyrrolidine,
N-ethyl-3-butylpyrrolidine,
N-ethyl-2-isohexylpyrrolidine,
N-ethyl-2,3-dimethylpyrrolidine,
N-ethyl-2,2,4-trimethylpyrrolidine,
N-ethyl-2,2-dimethylpyrrolidine,
N-ethyl-2,5-diethylpyrrolidine,
N-ethyl-3-tert-butylpyrrolidine,
N-ethyl-3,4-dioctylpyrrolidine,
N-ethylpiperidine,
N-ethyl-2-methylpiperidine,
N-ethyl-3-methylpiperidine,
N-ethyl-4-methylpiperidine,
N-ethyl-3-isopropylpiperidine,
N-ethyl-4-tert-butylpiperidine,
N-ethyl-2,4,6-trimethylpiperidine,
N,5-diethyl-2-methylpiperidine,
N-ethyl-3,5-dipentylpiperidine,
N-ethyl-2,6-dimethyl-4-octylpiperidine,
N-ethylhexahydroazepine,
N-ethyl-2-ethylhexahydroazepine,
N-ethyl-4-tert-butylhexahydroazepine,
N-ethyl-3,3-dimethylhexahydroazepine,
N-ethyl-2,4,6-tripropylhexahydroazepine,
N-ethylheptamethylenimine,
N-ethyl-2-methylheptamethylenimine,
N-ethyl-2,4-diisopropylheptamethylenimine,
N-ethyl-3,3-dimethylheptamethylenimine,
N-ethyloctamethylenimine,
N-ethyl-3-methyloctamethylenimine,
N-ethyl-4-isooctyloctamethylenimine,
N-ethylmorpholine,
N,2,2-triethylmorpholine,
N,5-diethyl-2-methylmorpholine,
N-ethyl-3,3-dimethylmorpholine,
N-ethylthiomorpholine,
N-ethyl-3-methylthiomorpholine, and
N-ethyl-2,2-dipentylthiomorpholine, there are obtained
N,N'-[sulfonylbis(ethyleneoxy)]bisdimethylamine,
N,N'-[sulfonylbis(ethyleneoxy)]bis-N-methylethylamine,
N,N'-[sulfonylbis(ethyleneoxy)]bisdipropylamine,
N,N'-[sulfonylbis(ethyleneoxy)]bisdiisopropylamine,
N,N'-[sulfonylbis(ethyleneoxy)]bis-N-methylisopropylamine,
N,N'-[sulfonylbis(ethyleneoxy)]bisdibutylamine,
N,N'-[sulfonylbis(ethyleneoxy)]bisdi-sec-butylamine,
N,N'-[sulfonylbis(ethyleneoxy)]bisdiisobutylamine,
N,N'-[sulfonylbis(ethyleneoxy)]bis-di-tert-butylamine,
N,N'-[sulfonylbis(ethyleneoxy)]bis-N-methylbutylamine,
N,N'-[sulfonylbis(ethyleneoxy)]bis-N-ethyl-sec-butylamine,
N,N'-[sulfonylbis(ethyleneoxy)]bisdipentylamine,
N,N'-[sulfonylbis(ethyleneoxy)]bisdiisopentylamine,
N,N'-[sulfonylbis(ethyleneoxy)]bis-N-methylpentylamine,
N,N'-[sulfonylbis(ethyleneoxy)]bis-N-ethyl-2-methylbutylamine,
N,N'-[sulfonylbis(ethyleneoxy)]bisdihexylamine,
N,N'-[sulfonylbis(ethyleneoxy)]bisdiisohexylamine,
N,N'-[sulfonylbis(ethyleneoxy)]bis-N-methylhexylamine,
N,N'-[sulfonylbis(ethyleneoxy)]bis-N-ethyl-2,3-dimethylbutylamine,
N,N'-[sulfonylbis(ethyleneoxy)]bis-N-propylethylamine,
N,N'-[sulfonylbis(ethyleneoxy)]-bisaziridine,
N,N'-[sulfonylbis(ethyleneoxy)]bis-2-methylaziridine,
N,N'-[sulfonylbis(ethyleneoxy)]bis-2,3-dimethylaziridine,
N,N'-[sulfonylbis(ethyleneoxy)]bis-2,2-dimethylaziridine,
N,N'-[sulfonylbis(ethyleneoxy)]bis-azetidine,
N,N'-[sulfonylbis(ethyleneoxy)]bis-2-methylazetidine,
N,N'-[sulfonylbis(ethyleneoxy)]bis-3-methylazetidine,
N,N'-[sulfonylbis(ethyleneoxy)]bis-2-octylazetidine,
N,N'-[sulfonylbis(ethyleneoxy)]bis-2,2-dimethylazetidine,
N,N'-[sulfonylbis(ethyleneoxy)]bis-3,3-dimethylazetidine,
N,N'-[sulfonylbis(ethyleneoxy)]bis-2,2,4-trimethylazetidine,
N,N'-[sulfonylbis(ethyleneoxy)]bispyrrolidine,
N,N'-[sulfonylbis(ethyleneoxy)]bis-2-methylpyrrolidine,
N,N'-[sulfonylbis(ethyleneoxy)]bis-3-butylpyrrolidine,
N,N'-[sulfonylbis(ethyleneoxy)]bis-2-isohexylpyrrolidine,
N,N'-[sulfonylbis(ethyleneoxy)]bis-2,3-dimethylpyrrolidine,
N,N'-[sulfonylbis(ethyleneoxy)]bis-2,2,4-trimethylpyrrolidine,
N,N'-[sulfonylbis(ethyleneoxy)]bis-2,2-dimethylpyrrolidine,
N,N'-[sulfonylbis(ethyleneoxy)]bis-2,5-diethylpyrrolidine,
N,N'-[sulfonylbis(ethyleneoxy)]bis-3-tert-butylpyrrolidine,
N,N'-[sulfonylbis(ethyleneoxy)]bis-3,4-dioctylpyrrolidine,
N,N'-[sulfonylbis(ethyleneoxy)]bispiperidine,
N,N'-[sulfonylbis(ethyleneoxy)]bis-2-methylpiperidine,
N,N'-[sulfonylbis(ethyleneoxy)]bis-3-methylpiperidine,
N,N'-[sulfonylbis(ethyleneoxy)]bis-4-methylpiperidine,
N,N'-[sulfonylbis(ethyleneoxy)]bis-3-isopropylpiperidine,
N,N'-[sulfonylbis(ethyleneoxy)]bis-4-tert-butylpiperidine,
N,N'-[sulfonylbis(ethyleneoxy)]bis-2,4,6-trimethylpiperidine,
N,N'-[sulfonylbis(ethyleneoxy)]bis-5-ethyl-2-methylpiperidine,
N,N'-[sulfonylbis(ethyleneoxy)]bis-3,5-dipentylpiperidine,
N,N'-[sulfonylbis(ethyleneoxy)]bis-2,6-dimethyl-4-octylpiperidine, N,N'-[sulfonylbis(ethyleneoxy)]bishexahydroazepine,
N,N'-[sulfonylbis(ethyleneoxy)]bis-2-ethylhexahydroazepine,
N,N'-[sulfonylbis(ethyleneoxy)]bis-4-tert-butylhexahydroazepine,
N,N'-[sulfonylbis(ethyleneoxy)]bis-3,3-dimethylhexahydroazepine,
N,N'-[sulfonylbis(ethyleneoxy)]bis-2,4,6-tripropylhexahydroazepine,
N,N'-[sulfonylbis(ethyleneoxy)]bisheptamethylenimine,
N,N'-[sulfonylbis(ethyleneoxy)]bis-2-methylheptamethylenimine,
N,N'-[sulfonylbis(ethyleneoxy)]bis-2,4-diisopropylheptamethylenimine,
N,N'-[sulfonylbis(ethyleneoxy)]bis-3,3-dimethylheptamethylenimine,
N,N'-[sulfonylbis(ethyleneoxy)]bisoctamethylenimine,
N,N'-[sulfonylbis(ethyleneoxy)]bis-3-methyloctamethylenimine,
N,N'-[sulfonylbis(ethyleneoxy)]bis-4-isooctyloctamethylenimine,
N,N'-[sulfonylbis(ethyleneoxy)]bismorpholine,
N,N'-[sulfonylbis(ethyleneoxy)]bis-2,2-diethylmorpholine,
N,N'-[sulfonylbis(ethyleneoxy)]bis-5-ethyl-2-methylmorpholine,
N,N'-[sulfonylbis(ethyleneoxy)]bis-3,3-dimethylmorpholine,
N,N'-[sulfonylbis(ethyleneoxy)]bisthiomorpholine,
N,N'-[sulfonylbis(ethyleneoxy)]bis-3-methylthiomorpholine, and
N,N'-[sulfonylbis(ethyleneoxy)]bis-2,2-dipentylthiomorpholine, respectively.

Following the procedure of part C, the above amines are converted to the dihydrochloride. By substituting the hydrochloric acid by hydrobromic, sulfuric, phosphoric, nitric, perchloric, thiocyanic, fluosilicic, acetic, benzoic, salicylic, glycolic, succinic, nicotinic, tartaric, maleic, malic, lactic, methanesulfonic, and cyclohexanesulfamic acids, the corresponding salts of the above amines are obtained.

I claim:
1. A compound selected from the group consisting the free base form and acid addition salts of a compou of the formula:

$$RRN-O-CH_2CH_2-SO_2-CH_2CH_2-O-NRR$$

wherein RRN— is di-lower-alkylamino or the heterocyc moieties, aziridinyl, azetidinyl, pyrrolidinyl, piperidir hexahydroazepinyl, heptamethylenimino, octamethyle imino, morpholino, or thiomorpholino, each of sa heterocyclic moieties having attached as substituents carbon atoms thereof zero to 3 lower alkyls, inclusive.

2. N,N'-[sulfonylbis(ethyleneoxy)]bisdiethylamine hydrochloride.

3. The method for making compounds of the formul:

$$RRN-O-CH_2CH_2-SO_2-CH_2CH_2-O-NRR$$

wherein RRN— is di-lower-alkylamino or the heterocycl moieties, aziridinyl, azetidinyl, pyrrolidinyl, piperidin hexahydroazepinyl, heptamethylenimino, octamethyle imino, morpholino, or thiomorpholino, each of sai heterocyclic moieties having attached as substituents o carbon atoms thereof zero to 3 lower alkyls, inclusive which comprises reacting divinyl sulfone with a hydroxy amine of the formula RRN—OH wherein RRN— is a given above.

4. N,N' - [sulfonylbis(ethyleneoxy)]bis - di - lowei alkylamine.

5. The acid addition salts of N,N' - [sulfonylbis (ethyleneoxy)]bis-di-lower-alkylamine.

References Cited by the Examiner
UNITED STATES PATENTS 2,140,608  12/1938  Ufer _____ 260—583 X

OTHER REFERENCES

Price et al.: "Sulfur Bonding," Ronald Press Co., New York (1962), p. 112.

CHARLES B. PARKER, *Primary Examiner.*
ANTON H. SUTTO, RICHARD L. RAYMOND,
*Assistant Examiners.*